United States Patent
Aldana et al.

(10) Patent No.: US 10,491,497 B2
(45) Date of Patent: Nov. 26, 2019

(54) ROUND TRIP TIME DETERMINATION

(71) Applicant: QUALCOMM Incorporated, San Diego, CA (US)

(72) Inventors: Carlos Horacio Aldana, Mountain View, CA (US); Didier Johannes Richard van Nee, Tull en 't Waal (NL); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 767 days.

(21) Appl. No.: 14/812,975

(22) Filed: Jul. 29, 2015

(65) Prior Publication Data
US 2016/0072689 A1 Mar. 10, 2016

Related U.S. Application Data

(60) Provisional application No. 62/046,749, filed on Sep. 5, 2014.

(51) Int. Cl.
*H04L 12/26* (2006.01)
*H04B 7/0413* (2017.01)
(Continued)

(52) U.S. Cl.
CPC ....... *H04L 43/0864* (2013.01); *H04B 7/0413* (2013.01); *H04W 24/10* (2013.01);
(Continued)

(58) Field of Classification Search
CPC .. H04L 43/0864; H04W 24/10; H04W 4/023; H04W 56/0005; H04W 72/0446;
(Continued)

(56) References Cited

U.S. PATENT DOCUMENTS 8,104,091 B2 * 1/2012 Qin ................ G06F 21/10
726/26
8,982,930 B2 * 3/2015 Kimura ............. H04B 7/0452
370/276
(Continued)

FOREIGN PATENT DOCUMENTS

CN 101621842 A 1/2010
CN 101669402 A 3/2010
(Continued)

OTHER PUBLICATIONS

Aldana, C., et al., "802.11-2012 CID_ 46_47_48; 11-12-1249-04-000m-802-11-2012-cid-46-47-48", Qualcomm, IEEE SA Mentor; Nov. 12, 1249-04-000M-802-11-2012-CID-46-47-48, IEEE-SA Mentor, Piscataway, NJ USA, vol. 802.11m, No. 4, Jan. 17, 2013 (Jan. 17, 2013), 17 pages.
(Continued)

*Primary Examiner* — Kan Yuen
(74) *Attorney, Agent, or Firm* — Kilpatrick Townsend & Stockton, LLP

(57) ABSTRACT

Round trip time (RTT) measurements may be obtained from downlink (DL) trigger frame and uplink (UL) Multiple-Input Multiple-Output (MIMO) frame transactions, which can replace and/or complement separate RTT measurements. By implementing such techniques, wireless systems can make access to RTT measurements, and consequently, location determination of access points (APs) within the system, more easily accessible to navigation and/or other applications benefitting from such measurements and determinations.

38 Claims, 9 Drawing Sheets

(51) Int. Cl.
*H04W 24/10* (2009.01)
*H04W 56/00* (2009.01)
*H04W 72/04* (2009.01)
*H04W 88/02* (2009.01)
*H04W 88/08* (2009.01)

(52) U.S. Cl.
CPC ... *H04W 56/0005* (2013.01); *H04W 72/0446* (2013.01); *H04W 88/02* (2013.01); *H04W 88/08* (2013.01)

(58) Field of Classification Search
CPC .... H04W 88/02; H04W 88/08; H04B 7/0404; H04B 7/0413; H04J 3/0667
See application file for complete search history.

(56) References Cited

U.S. PATENT DOCUMENTS

| | | | |
|---|---|---|---|
| 9,419,699 B2* | 8/2016 | Garrett | H04B 7/0617 |
| 2002/0126650 A1* | 9/2002 | Hall | H01Q 1/246 |
| | | | 370/349 |
| 2007/0268986 A1* | 11/2007 | Morita | H04L 27/2613 |
| | | | 375/295 |
| 2011/0170627 A1* | 7/2011 | Kwon | H04L 25/0204 |
| | | | 375/295 |
| 2011/0261742 A1* | 10/2011 | Wentink | H04L 1/1854 |
| | | | 370/312 |
| 2012/0044900 A1* | 2/2012 | Morioka | H04B 7/0617 |
| | | | 370/329 |
| 2012/0093198 A1* | 4/2012 | Dabak | H04B 3/542 |
| | | | 375/139 |
| 2012/0106531 A1* | 5/2012 | Seok | H04B 7/0452 |
| | | | 370/338 |
| 2012/0295604 A1* | 11/2012 | Gunzelmann | H04B 1/1036 |
| | | | 455/422.1 |
| 2012/0295654 A1* | 11/2012 | Sridhara | G01S 5/0226 |
| | | | 455/517 |
| 2013/0044607 A1* | 2/2013 | Liu | H04W 8/26 |
| | | | 370/242 |
| 2013/0198264 A1* | 8/2013 | Hellman | H04L 69/28 |
| | | | 709/203 |
| 2013/0243062 A1 | 9/2013 | Raju et al. | |
| 2013/0301551 A1* | 11/2013 | Ghosh | H04W 72/042 |
| | | | 370/329 |
| 2013/0301569 A1* | 11/2013 | Wang | H04L 5/0055 |
| | | | 370/329 |
| 2013/0329702 A1* | 12/2013 | Yucek | H04W 72/046 |
| | | | 370/336 |
| 2013/0336340 A1* | 12/2013 | Ando | H04J 3/0682 |
| | | | 370/503 |
| 2014/0073352 A1 | 3/2014 | Aldana et al. | |
| 2016/0142185 A1* | 5/2016 | Merlin | H04L 1/1607 |
| | | | 370/312 |

FOREIGN PATENT DOCUMENTS

| | | |
|---|---|---|
| CN | 102415128 A | 4/2012 |
| CN | 103378947 A | 10/2013 |
| JP | 2007208522 A | 8/2007 |
| JP | 2010263489 A | 11/2010 |

OTHER PUBLICATIONS

International Search Report and Written Opinion—PCT/US2015/042963—ISA/EPO—dated Nov. 12, 2015.
Chun J., et al., "Uplink Multi-User Transmission", IEEE 802.11-13/1388r0, Nov. 2013, Slide 1-18.
Nguyen T.T.T., et al., "Uplink Multi-User MAC Protocol for 11ax", IEEE 802.11-14/0598r0, May 2014, Slide 1-19.

* cited by examiner

ROUND TRIP TIME DETERMINATION

CROSS REFERENCE TO RELATED APPLICATIONS

This application claims the benefit of U.S. Provisional Patent Application Ser. No. 62/046,749, entitled "UPLINK MULTIPLE-INPUT MULTIPLE-OUTPUT ROUND TRIP TIME," filed on Sep. 5, 2014, which is assigned to the assignee hereof and incorporated herein by reference for all purposes.

BACKGROUND

Wireless data communication systems utilizing Multiple-Input Multiple-Output (MIMO) technology are used in standards such as IEEE 802.11n and IEEE 802.11ac to enable wireless devices (STAs) to communicate with access points (APs) at high data rates. Such systems may also be used in applications where the location of STAs is determined Location determination using round trip time (RTT) measurements, however, is typically determined through distinct RTT measurement transactions, which consume both time and bandwidth.

SUMMARY

Techniques described herein provide for acquiring RTT measurements from downlink (DL) trigger frame and uplink (UL) MIMO frame transactions, which can replace and/or complement separate RTT measurements. By implementing such techniques, wireless systems can make access to RTT measurements, and consequently, location determination of APs within the system, more easily accessible to navigation and/or other applications benefitting from such measurements and determinations.

An example method of calculating RTT between a first wireless device and a second wireless device, according to the disclosure, comprises sending a downlink (DL) trigger frame with the first wireless device, determining a first time corresponding to a time at which the DL trigger frame was sent, and receiving, at the first wireless device, an uplink (UL) Multiple-Input Multiple-Output (MIMO) frame from the second wireless device. The example method further includes determining a second time corresponding to a time at which the UL MIMO frame was received, and determining the RTT between the first wireless device and the second wireless device based on the determined first time and the determined second time.

The method can include one or more of the following features. The method may further comprise determining the second time is further based on a synchronization sequence within the UL MIMO frame. The synchronization sequence may directly follow a preamble of the UL MIMO frame. The synchronization sequence may comprise a Zadofff-chu sequence, a Long Training Field (LTF)-like sequence, an M sequence, a Gold sequence, a Costas sequence, a Bjork sequence set, a Kasami sequence, or a Zero-Correlation Zone sequence, or a combination thereof. The method may further comprise storing a value of the RTT, receiving, at the first wireless device, an RTT request, and in response to receiving the RTT request, sending the stored value of the RTT. Determining the RTT may further comprise determining a short inter-frame spacing (SIFS) value. The SIFS value may be determined from information provided from the second wireless device to the first wireless device. The provided information may be included in the UL MIMO frame. The SIFS value may be obtained from a database.

Another method of calculating round trip time (RTT) between a first wireless device to a second wireless device, according to the disclosure, comprises receiving, with the second wireless device, a downlink (DL) trigger frame sent by the first wireless device, determining, at the second wireless device, an uplink (UL) Multiple-Input Multiple-Output (MIMO) frame length, determining a location, within the UL MIMO frame, for a synchronization sequence, and sending, from the second wireless device to the first wireless device, the UL MIMO frame with the synchronization sequence.

The method may include one or more of the following features. Determining the location for the synchronization sequence may comprise determining to locate the synchronization sequence immediately after a preamble of the UL MIMO frame. Determining the location for the synchronization sequence may comprise determining to locate the synchronization sequence at an end of the UL MIMO frame. Determining a length of the synchronization sequence such that the length of the overall UL MIMO frame, including the synchronization sequence, reaches a certain length.

An example first wireless device, according to the disclosure, comprises a wireless communication interface configured to send a downlink (DL) trigger frame, a memory, and a processing unit communicatively coupled to the wireless communication interface and the memory. The processing unit is configured to cause the first wireless device to determine a first time corresponding to a time at which the DL trigger frame was sent, receive, via the wireless communication interface, an uplink (UL) Multiple-Input Multiple-Output (MIMO) frame from a second wireless device, determine a second time corresponding to a time at which the UL MIMO frame was received, and determine a round trip time (RTT) between the first wireless device and the second wireless device based on the determined first time and the determined second time.

The first wireless device can comprise one or more of the following features. The processing unit may be further configured to cause the first wireless device to determine the second time further based on a synchronization sequence within the UL MIMO frame. The processing unit may be further configured to cause the first wireless device to store a value of the RTT in the memory, receive, via the wireless communication interface, an RTT request, and in response to receiving the RTT request, send the stored value of the RTT via the wireless communication interface. The processing unit may be further configured to cause the first wireless device to determine the RTT by determining a short inter-frame spacing (SIFS) value. The processing unit may be configured to cause the first wireless device to determine the SIFS value from information provided from the second wireless device to the first wireless device. The processing unit may be configured to cause the first wireless device to extract the provided information from the UL MIMO frame. The processing unit may be configured to cause the first wireless device to obtain the SIFS value from a database.

An example second wireless device, according to the disclosure, comprises a wireless communication interface configured to receive a downlink (DL) trigger frame from a first wireless device, a memory, and a processing unit communicatively coupled to the wireless communication interface and the memory. The processing unit is configured to cause the second wireless device to determine an uplink (UL) Multiple-Input Multiple-Output (MIMO) frame length, determine a location, within the UL MIMO frame, for a synchronization sequence, and send, to the first wireless device via the wireless communication interface, the UL MIMO frame with the synchronization sequence.

The second wireless device can include one or more of the following features. The processing unit can be configured to cause the second wireless device to determine to locate the synchronization sequence immediately after a preamble of the UL MIMO frame. The processing unit can be configured to cause the second wireless device to determine to locate the synchronization sequence at an end of the UL MIMO frame. The processing unit can be configured to cause the second wireless device to determine a length of the synchronization sequence such that the length of the overall UL MIMO frame, including the synchronization sequence, reaches a certain length.

An example first wireless device, according to the description, includes means for sending a downlink (DL) trigger frame, means for determining a first time corresponding to a time at which the DL trigger frame was sent, means for receiving an uplink (UL) Multiple-Input Multiple-Output (MIMO) frame from a second wireless device, means for determining a second time corresponding to a time at which the UL MIMO frame was received, and means for calculating a round trip time (RTT) value for the RTT between the first wireless device and the second wireless device based on the determined first time and the determined second time.

The first wireless device can include one or more of the following features. The first wireless device can include means for basing the determined second time on a synchronization sequence within the UL MIMO frame. The first wireless device can include means for storing a value of the RTT, means for receiving, at the first wireless device, an RTT request, and means for, in response to receiving the RTT request, sending the stored value of the RTT. The first wireless device can include means for determining a short inter-frame spacing (SIFS) value. The first wireless device can include means for determining the SIFS value from information provided from the second wireless device to the first wireless device. The first wireless device can include means for extracting the provided information from the UL MIMO frame. The first wireless device can include means for obtaining the SIFS value from a database.

An example second wireless device, according to the description, includes means for receiving a downlink (DL) trigger frame sent by a first wireless device, means for determining an uplink (UL) Multiple-Input Multiple-Output (MIMO) frame length, means for determining a location, within the UL MIMO frame, for a synchronization sequence, and means for sending, to the first wireless device, the UL MIMO frame with the synchronization sequence.

The second wireless device can include one or more of the following features. The second wireless device can include means for locating the synchronization sequence immediately after a preamble of the UL MIMO frame. The second wireless device can include means for locating the synchronization sequence at an end of the UL MIMO frame. The second wireless device can include means for determining a length of the synchronization sequence such that the length of the overall UL MIMO frame, including the synchronization sequence, reaches a certain length.

An example non-transitory computer-readable medium, according to the disclosure, has instructions embedded thereon for calculating round trip time (RTT) between a first wireless device to a second wireless device. The instructions comprise computer code for sending a downlink (DL) trigger frame with the first wireless device, determining a first time corresponding to a time at which the DL trigger frame was sent, receiving, at the first wireless device, an uplink (UL) Multiple-Input Multiple-Output (MIMO) frame from the second wireless device, determining a second time corresponding to a time at which the UL MIMO frame was received, and determining the RTT between the first wireless device and the second wireless device based on the determined first time and the determined second time.

The non-transitory computer-readable medium can further comprise computer code to implement one or more of the following features. The computer code for determining the second time can include computer code for basing the determination of the second time on a synchronization sequence within the UL MIMO frame. The computer-readable medium can further comprise computer code for storing a value of the RTT, receiving, at the first wireless device, an RTT request, and in response to receiving the RTT request, sending the stored value of the RTT.

Another example non-transitory computer-readable medium, according to the disclosure has instructions embedded thereon for calculating round trip time (RTT) between a first wireless device to a second wireless device. The instructions comprise computer code for receiving, with the second wireless device, a downlink (DL) trigger frame sent by the first wireless device, determining, at the second wireless device, an uplink (UL) Multiple-Input Multiple-Output (MIMO) frame length, determining a location, within the UL MIMO frame, for a synchronization sequence, and sending, from the second wireless device to the first wireless device, the UL MIMO frame with the synchronization sequence.

The non-transitory computer-readable medium can further comprise computer code to implement one or more of the following features. The computer code for determining the location for the synchronization sequence can comprise computer code for determining to locate the synchronization sequence immediately after a preamble of the UL MIMO frame. The computer-readable medium can further comprise computer code for determining a length of the synchronization sequence such that the length of the overall UL MIMO frame, including the synchronization sequence, reaches a certain length.

BRIEF DESCRIPTION OF THE DRAWINGS

An understanding of the nature and advantages of various embodiments may be realized by reference to the following figures.

DETAILED DESCRIPTION

Figure 1:
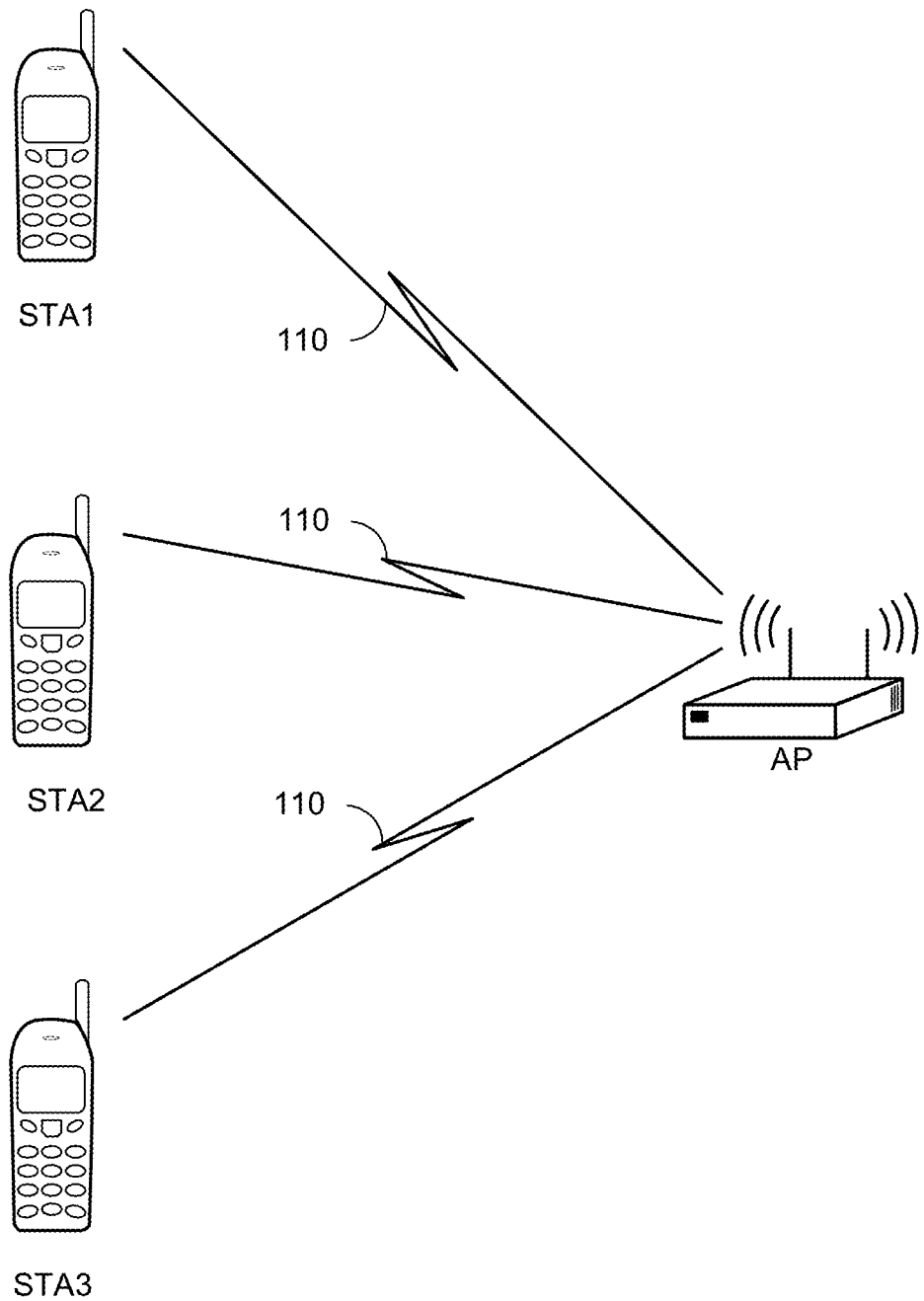
FIG. 1 is an illustration of a basic setup in which Round Trip Time (RTT) may be obtained from uplink (UL) Multiple-Input Multiple-Output (MIMO) frames, according to one embodiment.

Wireless communication systems may comprise wireless devices and access points (APs). The wireless devices can be configured as mobile stations (STAs) which can communicate directly with one another or through the APs. Standards such as IEEE 802.11ac, 802.11ad, 802.11v, 802.11mc, etc. are commonly used for such communications. These standards can include error specifications to ensure quality of communication. STAs may comprise devices such as mobile phones, notebooks, tablets, portable media players, portable gaming systems, and/or other wireless devices that may utilize these or other wireless standards.

Wireless communication systems may further employ Multiple-Input Multiple-Output (MIMO) technology to enable APs and STAs to transfer more data at the same time. MIMO technology is utilized in a variety of standards, including IEEE 802.11n, 802.11ac, and upcoming 802.11ax. Downlink (DL) trigger frame is a one-to-many communication in which an AP is able to send a single packet to a plurality of STAs to coordinate communication within the wireless system. Uplink (UL) MIMO frames are sent in response, in which a plurality of STAs send UL MIMO frames to an AP in a many-to-one communication.

Traditionally, there is nothing native in DL trigger frame/UL MIMO frame transaction that provides for the determination of round trip time (RTT). But RTT measurements are valuable in a wireless system because they can be beneficial in many applications where the location of the STAs or range between STAs and/or other devices within the wireless system is determined Traditional techniques for determining RTT is through the utilization of a separate exchange of messages or dialogs between an AP and one or more STAs, which can cost additional time and bandwidth. Techniques described herein, however, provide for utilizing the features of UL MIMO frames to determine of round trip time (RTT) between the AP and STAs without the need for a separate RTT transaction.

In general, embodiments described herein may pertain to wireless communications for devices utilizing wireless local area networks (WLAN) according to various IEEE 802.11 messaging standards. Embodiments may acquire RTT measurements of STAs using UL MIMO frames as described herein, which can then be stored and/or provided to applications on demand, replacing and/or complementing separate RTT measurements. The APs may transmit and receive wireless signals following various IEEE 802.11 standards, such as 802.11g, 802.11n, 802.11 ac, 802.11ad, etc. In some embodiments, STAs may comply with 802.11ac, 802.11v, and/or 802.11REVmc standards while transmitting or receiving signals from multiple antennas. In some embodiments, the content and/or utilization of UL MIMO frames as described herein may be codified in revised 802.11 standards. In some cases, a wireless device (e.g., a mobile phone) may act as an AP and/or a STA. Additionally, because an AP may function as a STA in certain scenarios, the term "STA" as used herein, refers more specifically to a non-AP STA.

That said, it will be understood that techniques described herein can be used in other applications, with other wireless devices, and/or using other wireless standards. Specifically, although embodiments herein describe the utilization of a DL frame and a UL MIMO frame, techniques herein may use one or more different frame types for determining RTT, in a manner similar to those described herein.

FIG. 1 is a simplified drawing that helps illustrate a basic setup in which RTT may be obtained from UL MIMO frames, according to one embodiment. Here, an AP can communicate with three STAs—STA1, STA2, and STA3—using wireless communication signals 110. The wireless communication signals 110 may include UL and/or DL frames as described herein below. STAs may additionally communicate directly with each other via similar means. Additional STAs and/or APs (not shown) may be part of the same wireless system (e.g., WLAN). Some wireless systems may have fewer STAs. The AP may obtain RTT information by using UL MIMO frames sent from the STAs as described below. It will be understood that the techniques described herein may be utilized in systems having different configurations and/or components than those shown. Moreover, wireless systems may include other types of wireless devices. A person of ordinary skill in the art will recognize these and other variations to the embodiment shown in FIG. 1. The STAs and/or AP can correspond with the wireless device 800 described in FIG. 8 and/or may incorporate components of a computer, such as the computing system 900 of FIG. 9.

Figure 2:
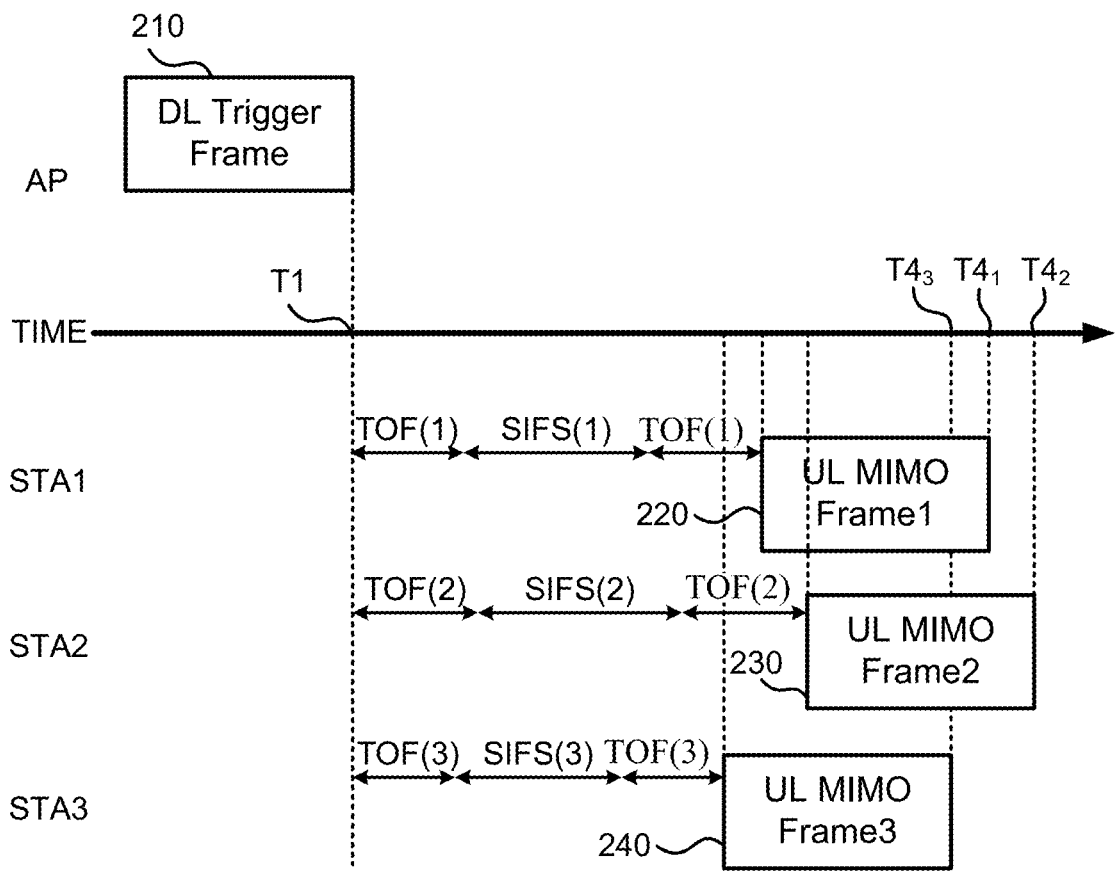
FIG. 2 is a simplified timing diagram that illustrates one embodiment for computing RTT between the AP and STAs illustrated in FIG. 1.

FIG. 2 is a simplified timing diagram that illustrates one embodiment for computing RTT between the AP and STAs illustrated in FIG. 1. (Note the RTT itself is not shown.) Here, the AP transmits a DL Trigger Frame 210 at time T1, and receives responses from STA1, STA2, and STA3 at times $T4_1$, $T4_2$, and $T4_3$, respectively. Here, times T1, $T4_1$, $T4_2$, and $T4_3$ are defined at the end of packets, but alternative embodiments may have times at different locations of the packets, which can depend on where synchronization sequences are located within the packets. Additional information regarding synchronization sequences is provided herein below. The time of flight (TOF) is the time it takes for the radio frequency (RF) signals to travel to an STA from the AP, and vice versa. This varies depending on the distance between the AP and STA, and is therefore indicative of the distance.

The content of the DL Trigger Frame 210 can vary, depending on the desired functionality. In some embodiments, the DL Trigger Frame 210 can include a group or other identifier(s) to address a subset of STAs in the wireless system. For example, in a wireless system in which there are 100 STAs, the DL Trigger Frame 210 may include a group ID of a group to which STA1, STA2, and STA3 belong. (In an embodiment where the 100 STAs form 34 groups—33 groups of three and one group of one—the AP could then repeat the process 33 additional times—each with a unique group ID—to get UL MIMO Frames from all 100 STAs.)

The receipt of the DL Trigger Frame 210 by each of the STAs prompts the STA to reply with a UL MIMO frame, in accordance with standard DL Trigger Frame/UL MIMO Frame transaction protocol. As shown in FIG. 2, STA1, STA2, and STA3 respond with UL MIMO Frame1, UL MIMO Frame2, and UL MIMO Frame3, respectively.

Short Interframe Space (SIFS) is the amount of time for a given wireless interface to process a received frame and to respond with a response frame. In some embodiments, SIFS is measured as the elapsed time between the first sample of the response frame in the air and the last sample of the received frame in the air. In an embodiment, SIFS may be comprised various cumulative receiver delays such as RF processing, physical layer processing delay and MAC layer processing delay. In an embodiment, the SIFS comprises the inter-frame spacing, measured in time, of each UL MIMO frame (and therefore times T4$_1$, T4$_2$, and T4$_3$), which may not be the same, and may vary due to differences in the hardware and/or software of the manufacturing of each of the STAs and/or other factors. In some embodiments, the SIFS can be determined and stored in the STA; in such embodiments, SIFS may be and provided by the STA to the AP. In an embodiment, SIFS may be sent by the STA to the AP, for example, in the UL MIMO frame or other response to the DL Trigger Frame such as in an additional response frame. In some embodiments, the SIFS can be obtained elsewhere, such as in a database accessible to the AP, for example, on a server such as a location server. This enables the AP to calculate RTT for each of the STAs as follows:

$$RTT(i)=T4_{(i)}-T1-SIFS(i)-L_{Frame(i)} \quad (1)$$

where i is 1, 2, or 3, and $L_{\_Frame(i)}$ is the length (measured in time) of the UL MIMO Frame of the STA. Additionally, each STA can provide a margin of error for its respective SIFS, which is typically known for a given STA type. Thus:

$$SIFS(i)=SIFS_{ideal} \pm k(i) \quad (2)$$

Where $SIFS_{ideal}$ is the ideal SIFS and k(i) is an integer indicating the margin of error (in some instances, for example, k=10 ns).

Figure 3:
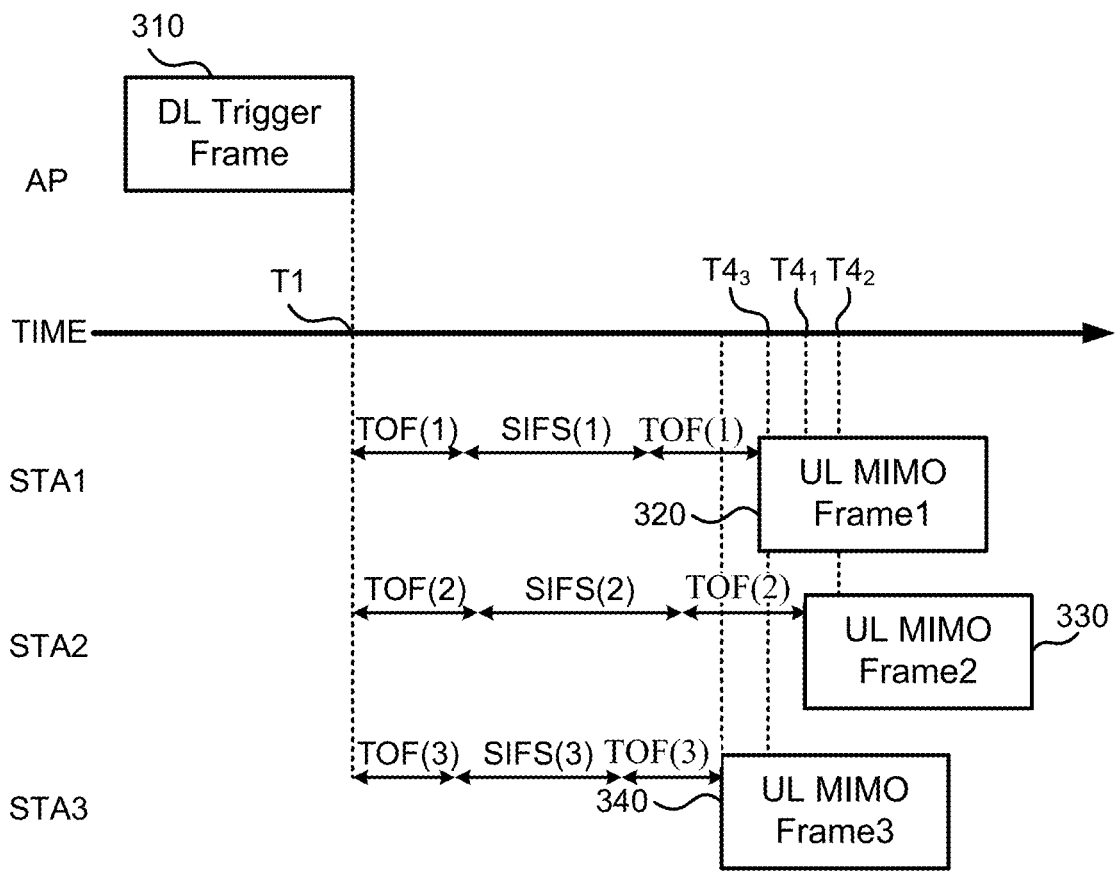
FIG. 3 is a simplified timing diagram that illustrates an alternative embodiment to FIG. 2.

FIG. 3 is a simplified timing diagram that illustrates an alternative embodiment for computing RTT between the AP and STAs illustrated in FIG. 1. Here, the DL trigger frame 310 and UL MIMO Frames 320, 330, and 340 are similar to corresponding frames in FIG. 2, except the synchronization sequences are now located after a preamble of the UL MIMO frames, which is near the front, rather than at the end of the frame. Where the preamble of each UL MIMO frame has the same length, $L_{Packet}$, RTT can be calculated as follows:

$$RTT(i)=T4_{(i)}-T1-SIFS(i)-L_{Packet} \quad 3)$$

A person of ordinary skill in the art will appreciate that equations (1) and (3) may be further altered to adapt to when, during the receipt of the UL MIMO frame, T4$_{(i)}$ is determined (e.g., corresponding to when synchronization sequence in the UL MIMO frame is completed). Embodiments may therefore determine how to use synchronization sequences in UL MIMO frames, and determine the RTT for the UL MIMO frames accordingly.

FIGS. 4A-4D are illustrations that show the generic contents of the UL MIMO frames, according to various embodiments, in reference the three STAs in the setup illustrated in FIG. 1. The content of the UL MIMO frames can vary, depending on desired functionality. In the illustrated embodiments, frames include preambles, data, and synchronization sequences. Preambles can be used, for example, to direct legacy devices to stop transmitting data. Synchronization sequences can help synchronize devices and improve the accuracy of time of arrival timestamps related to data communications within the wireless system. Alternative embodiments may include additional, alternative, or fewer types of data. For example, a UL MIMO frame with a large amount of data may have multiple synchronization sequences interspersed throughout the frame.

Figure 4A:
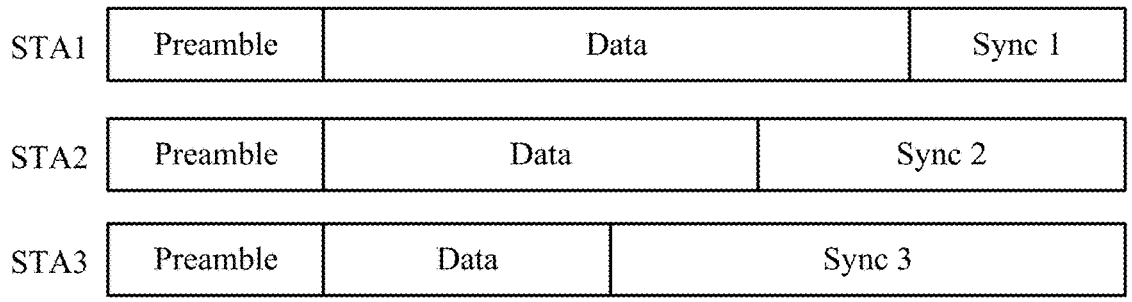
FIGS. 4A-4D are illustrations that show the generic contents of the UL MIMO frames, according to various embodiments.
Figure 4B:
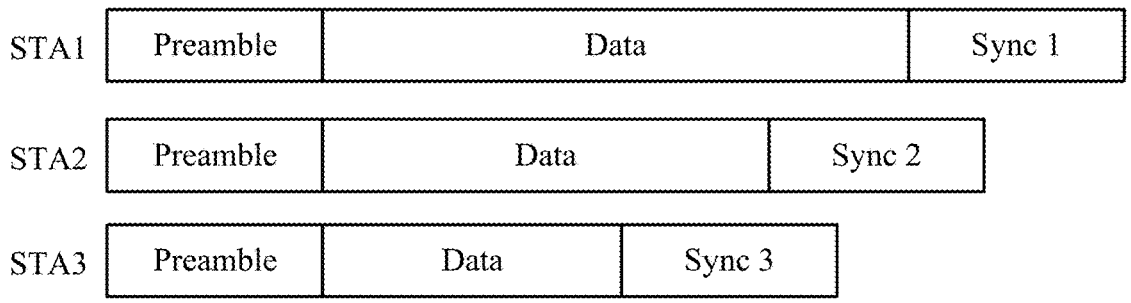

FIGS. 4A and 4B illustrate embodiments in which synchronization sequences (labeled Sync 1, Sync 2, and Sync 3, corresponding to UL MIMO frames from STA1, STA2, and STA3, respectively) are located at the end of the UL MIMO frames. As shown in FIG. 2, for embodiments where synchronization sequences are located at the end of the UL MIMO, the AP can calculate times T4$_1$, T4$_2$, and T4$_3$ at or near the end of each UL MIMO frame.

FIG. 4A illustrates how the length of synchronization sequences may be extended to help "pad" a UL MIMO frame to ensure it meets a certain length that may be required by a governing standard for UL MIMO frames. In some embodiments, the DL Trigger Frame (e.g., DL Trigger Frame 210 of FIG. 2) can specify this length. In some embodiments, this length may be predetermined (e.g., as part of a standard) or specified in other communication. To reach the certain length, synchronization sequences Sync 1, Sync 2, and Sync 3 may be cyclic shifts of each other, to help ensure orthogonality. As a generic example, Sync 1 may include components A, B, and C, in that order, whereas Sync 2 may include components B, C, and A, and Sync 3 includes C, A, and B. FIG. 4B, on the other hand, is an embodiment in which UL MIMO frame do not need to meet a certain length, which can be a beneficial technique for power savings among the STAs.

Figure 4C:
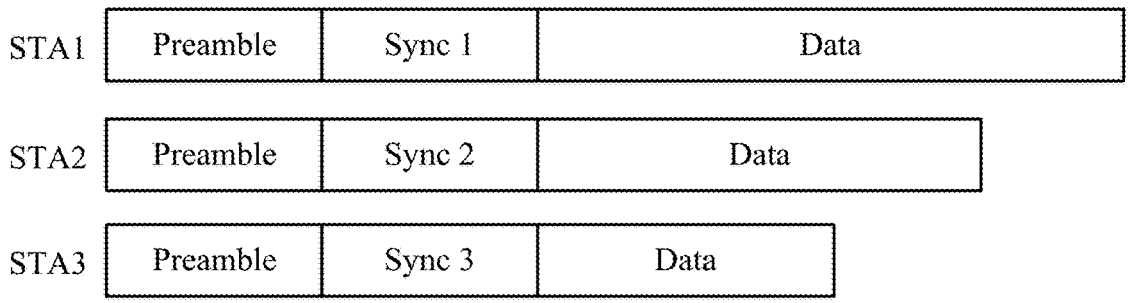
Figure 4D:
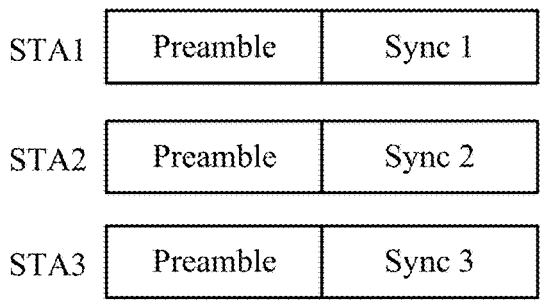

FIGS. 4C and 4D illustrate embodiments in which synchronization sequences directly follow the preamble of the UL MIMO frames, which can help with channel estimation, but may be subject to clock drift between devices. As shown in FIG. 3, for embodiments where synchronization sequences are located after the preamble of the UL MIMO, the AP can calculate times T4$_1$, T4$_2$, and T4$_3$ at or near the end of the synchronization sequence within each UL MIMO frame. FIG. 4C illustrates a power-saving embodiment, similar to FIG. 4B, but with synchronization sequences preceding the data. And FIG. 4D illustrates UL MIMO frames can allow STAs to synchronize, without transmitting any further data.

The types of synchronization sequences used in the embodiments provided herein can vary, depending on desired functionality. Some embodiments may include, for example, a Zadoff-chu sequence, such as those used in Long-Term Evolution (LTE) wireless systems, for a primary synchronization signal (PSS).

In a particular example, the Zadoff-chu sequence is periodic, with a period N=63, and a cyclic shift M={25, 29, 34}. In this case, auto correlation of a prime length sequence with a cyclically shifted version of itself is zero. However, perfect autocorrelation can be lost when there is frequency offset or when zero DC is enforced. The cross-correlation between two prime length sequences is constant provided u1−u2 is relative prime to N. Thus, where u1=29 and u2=25, u1−u2=4. Because 4 has no relative common factors with 63, the cross-correlation is constant. The same is true where u1=34, u2=29, and so forth. In other embodiments, other values for N and/or M may be used.

Other synchronization sequences that can be utilized in the embodiments provided herein include Long Training Field (LTF)-like sequences. Examples of LTF-like sequences include sequences that are periodic with a period of 3.2 μs. In certain implementations there is little spectral leakage, and an acceptable peak-to-average ratio (PAR) can be high (up to 12 dB, for example).

In some embodiments, a +1, −1 constellation search may be performed to determine the LTF-like sequences. In some embodiments, the sequences may be determined from any constellation possible. Where a wireless system utilizes a 4× symbol duration (such as IEEE 802.11ax) the search space can increase substantially. For example, where sequences have a period of 3.2 μs, the symbol duration is 12.8 μs. The 64 tones typically used in the 20 MHz spectrum, for example, are then increased to 256 tones, resulting in a much larger search space. The number of tones in higher frequencies is far greater.

Figure 5A:
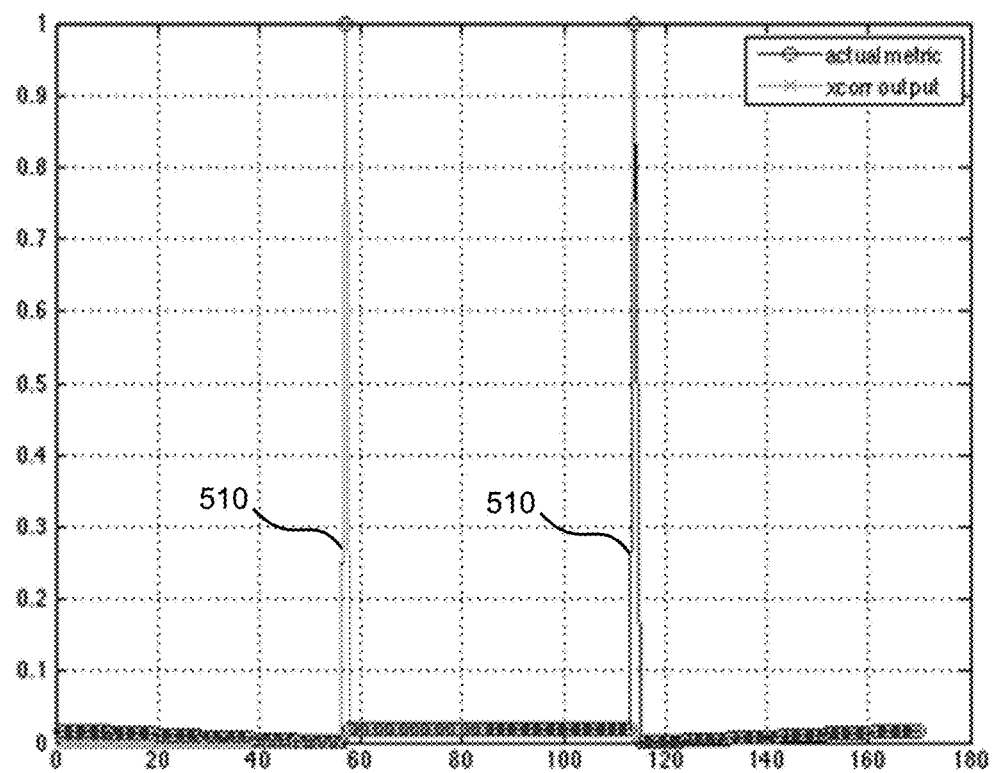
FIGS. 5A and 5B illustrate an example of one solution for determining an LTF-like sequence using convex optimization, according to one embodiment.
Figure 5B:
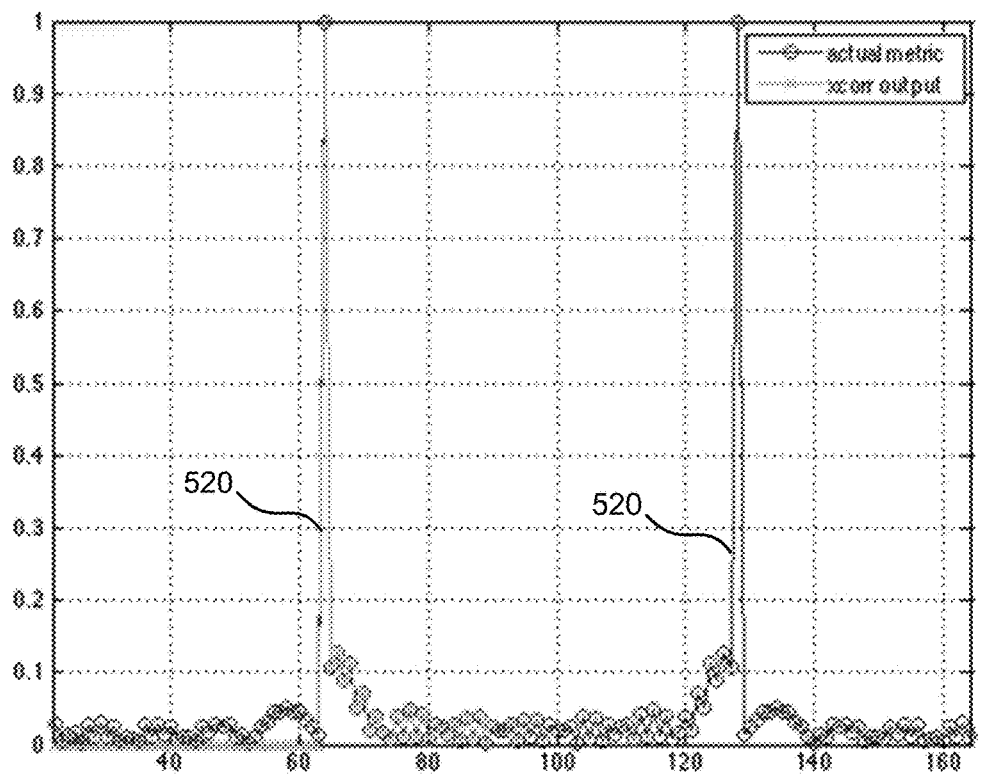

Convex optimization can be used to solve this problem efficiently without searching the entire search space. FIGS. 5A and 5B illustrate an example of one such solution.

FIGS. 5A and 5B are self-correlation plots of the convex optimization problem with N_tones=56 (i.e., 56 data tones), where the object is to minimize t, the value of the lag for all of the different lags of the cross-correlation, subject to the following conditions:

$$\|Q(:,:,jj)X\| <= t; \ jj \geq 1 \quad (4)$$

$$\|X(k)\| <= 1; \ -\frac{N\_tones}{2} \leq k \leq \frac{N\_tones}{2} - 1 \quad (5)$$

Where X is a frequency-domain vector and $Q(:,:,jj)DX$ is the cross-correlation for each lag, where $Q(:,:,jj)$ is the square root of $W'C(jj)RW$, W is the inverse fast Fourier Transform (IFFT) matrix, R is the anti-diagonal matrix, and $C(jj)$ is the convolution matrix describing the jj-th lag.

FIG. 5A illustrates the solution for Nfft=56 (matching the number of data tones), where FIG. 5B the plot on the right illustrates the solution for Nfft=64. Here, it can be seen that the sharper peaks 510 in FIG. 5A (compared with peaks 520 in FIG. 5B) indicate that the solution for Nfft=56 is a better solution. This can result in more accurate timing among the wireless devices. (It can be noted that, in practice, corrupting factors such as multipath can erode the sharpness of the peaks illustrated in FIGS. 5A and 5B.)

Other possible synchronization sequences can include, but are not limited to, M sequences, Gold sequences, Costas sequences (length can be N=Q(Q+1), where Q is a constant mainlobe to sidelobe ratio), Bjork sequence sets, Kasami Sequences, Zero-Correlation Zone sequences, and the like.

In sum, the use of such synchronization sequences can provide for the accurate determination of times, such as $T4_1$, $T4_2$, and $T4_3$ in FIGS. 2 and 3, which are used to determine the RTT for STA1, STA2, and STA3, respectively. Effective synchronization sequences therefore can result in accurate RTT values. These RTTs can be calculated by an AP for some or all UL MIMO frames received, enabling an AP to provide an RTT value for a particular STA upon request (e.g., by the STA, a network server, etc.) without taking separate RTT measurements. That said, processes described herein can be used to complement other techniques for determining RTT. Moreover, some embodiments, the AP may provide data for calculating an RTT value to another device to make the calculation.

Figure 6:
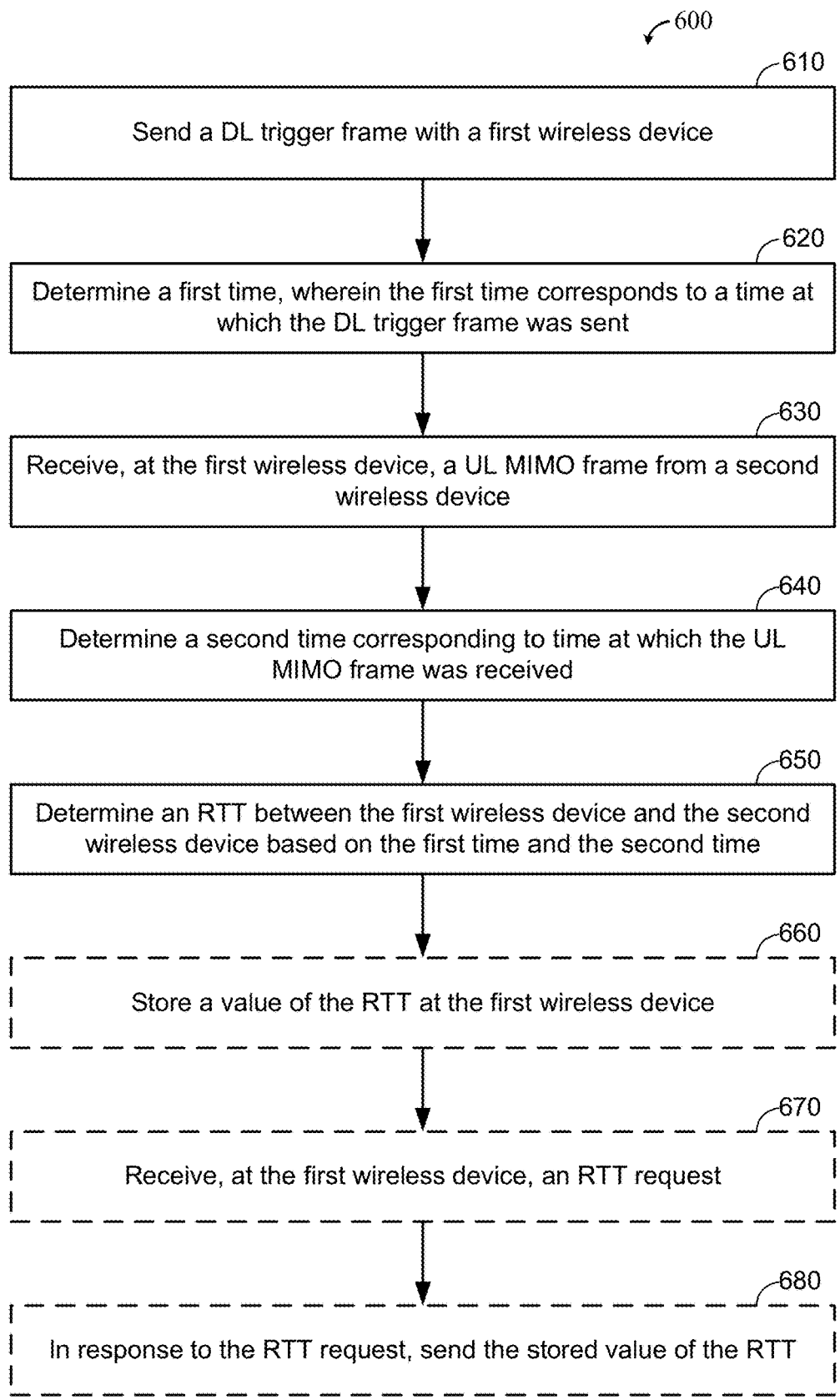
FIG. 6 is a flow diagram illustrating an embodiment of a method of calculating RTT from a first wireless device to a second wireless device.

It will be appreciated that embodiments include various methods for determining RTT from a UL MIMO frame as disclosed above. For example, an embodiment can include the method 600 of calculating RTT from a first wireless device (e.g., an AP) to a second wireless device (e.g., a STA) illustrated by the flow chart in FIG. 6. A person of ordinary skill in the art will recognize that alternative embodiments may include methods in which the components shown in FIG. 6 are rearranged, omitted, merged, separated, and/or otherwise altered. Means for performing one or more of the components shown in FIG. 6 can include one or more components of a wireless device, such as STA1, STA2, and STA3 of FIG. 1, the wireless device 800 shown in FIG. 8, and/or a computing device, such as the computing system 900 shown in FIG. 9. In some embodiments, an AP of a wireless system performs some or all of the blocks illustrated in FIG. 6.

Figure 9:
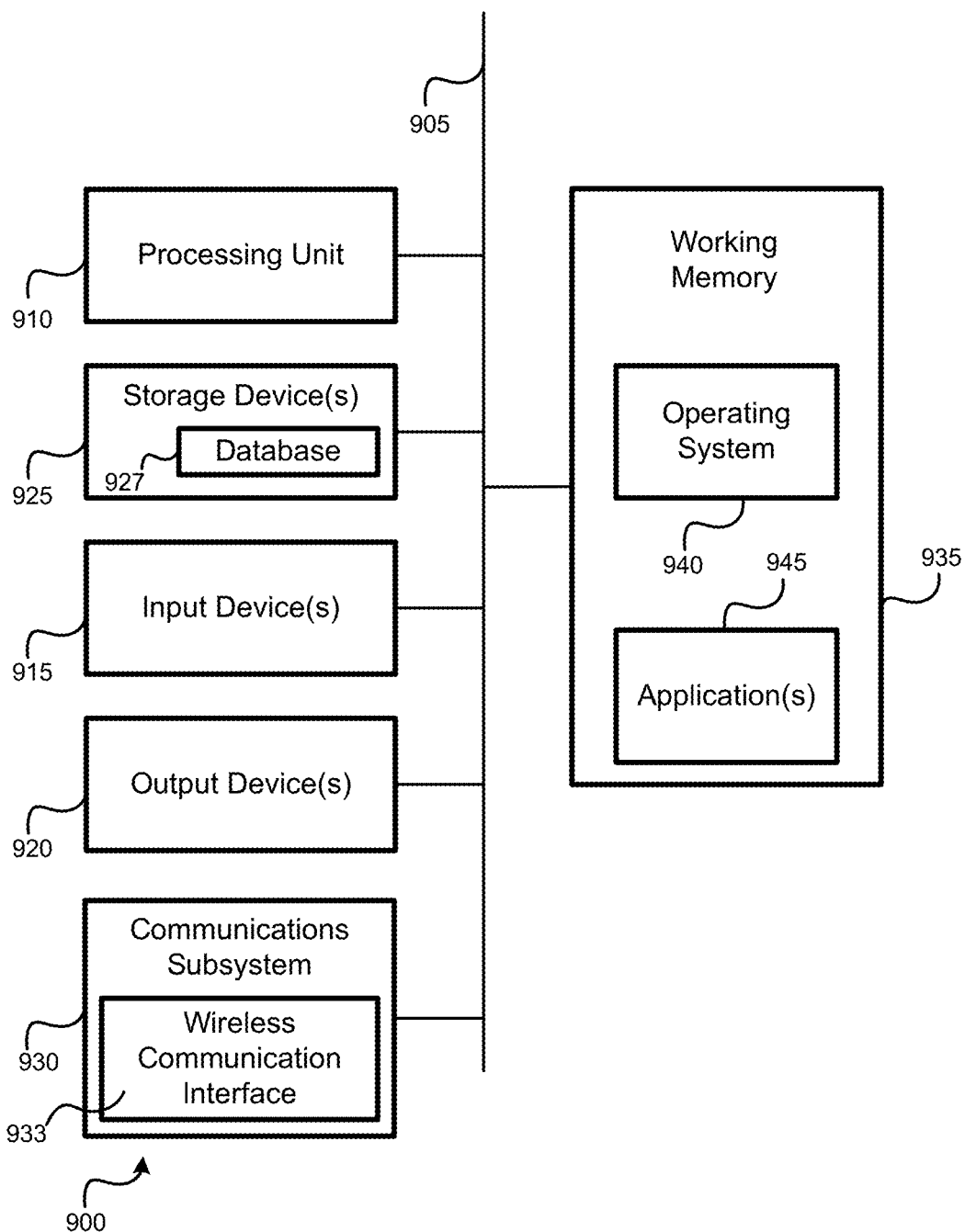
FIG. 9 is a block diagram an embodiment of a computing system.

At block 610, a DL trigger frame is sent with the first wireless device. As previously indicated, the DL trigger frame (e.g., item 210 of FIG. 2, item 310 of FIG. 3) can be a message that causes one or more STAs to response by sending a UL MIMO frame. In some embodiments, the DL trigger frame can include instructions for sending the UL MIMO frame, such as a specified frame length, requirements for including a SIFS value, and the like. The functionality at block 610 may be performed, for example, by the processing unit 910, bus 905, wireless communication interface 933, working memory 935, operating system 940, and/or application(s) 945 of a computing system, as shown in FIG. 9.

The functionality at block 620 includes determining a first time corresponding to a time at which the DL trigger frame was sent. As indicated in the embodiments provided above, this time (e.g., T1 in equations (1) and (3)) can be determined by the time at which the sending of the DL trigger frame is complete (i.e., at the end of the DL trigger frame). In other embodiments, however, this first time may be determined at some other point with regard to the DL trigger frame. The functionality at block 620 may be performed, for example, by the processing unit 910, bus 905, working memory 935, operating system 940, and/or application(s) 945 of a computing system, as shown in FIG. 9.

At block 630, a UL MIMO frame from a second wireless device is received at the first wireless device. As indicated in the embodiments provided herein, the UL MIMO frame can include one or more of: a preamble, data, or a synchronization sequence. The UL MIMO frame, as well as the content of the DL trigger frame, and/or other aspects of the functionality of one or more of the blocks shown in FIG. 6 may be governed by applicable standards. The functionality at block 630 may be performed, for example, by the processing unit 910, bus 905, wireless communication interface 933, working memory 935, operating system 940, and/or application(s) 945 of a computing system, as shown in FIG. 9.

At block 640, a second time corresponding to a time at which the UL MIMO frame was received is determined As shown in the various embodiments above, the second time (e.g., $T4_x$ in equations (1) and (3)) can be based on when, in the UL MIMO frame, a synchronization sequence is received by the first wireless device. As indicated herein above, the synchronization sequence may be included at the end of the UL MIMO frame or follow directly after the preamble. Some embodiments may include the synchronization sequence elsewhere in the UL MIMO frame. Moreover, some embodiments may provide for multiple synchronization sequences within the UL MIMO frame. As indicated previously, synchronization sequences may comprise at least one of a Zadofff-chu sequence, a Long Training Field (LTF)-like sequence, an M sequence, a Gold sequence, a Costas sequence, a Bjork sequence set, a Kasami sequence, or a Zero-Correlation Zone sequence. The functionality at block 640 may be performed, for example, by the processing unit 910, bus 905, working memory 935, operating system 940, and/or application(s) 945 of a computing system, as shown in FIG. 9.

At block 650, the RTT between the first wireless device and the second wireless device based on the first time and the second time is determined Examples of such calculations are shown in equations (1) and (3) above. The RTT may be calculated in a similar manner using alternative techniques, depending on where, for example, a synchronization sequence is located within the received UL MIMO frame. Determining the RTT may comprise determining a SIFS value. As indicated in embodiments above, the SIFS value may be determined from information provided from the second wireless device to the first wireless device. In some embodiments, this information may be included in the UL MIMO frame. Additionally or alternatively, the SIFS value may be obtained from a database that may, for example, reside on a server such as a location server. The functionality at block 650 may be performed, for example, by the processing unit 910, bus 905, working memory 935, operating system 940, and/or application(s) 945 of a computing system, as shown in FIG. 9.

In some embodiments, the additional functionality at blocks 660, 670, and/or 680 may be performed. In particular, at block 660 a value of the RTT is stored at the first wireless device. The first wireless device can, for example, store the RTT value locally (e.g., on a memory of the device) and provide it to the second wireless device (e.g., the STA) and/or a server when an RTT value is requested. That is, at block 670, an RTT request may be received at the first wireless device. And at block 680, in response to the RTT request, the stored value of the RTT can be sent (e.g., by the first device to a requesting device). Depending on desired functionality and/or the requesting entity, the RTT can be sent to any of a variety of devices, including the second wireless device, a separate STA and/or AP, a location server, or other remote device. In some embodiments, the RTT value may be stored remotely and/or in more than one location. Embodiments may further store other information associated with the RTT values, such as an identifier of the STA and/or AP for which the RTT value applies, a timestamp to keep track of when the RTT value was determined, and so forth. The functionality at blocks 660, 670, and/or 680 may be performed, for example, by the processing unit 910, bus 905, wireless communication interface 933, working memory 935, operating system 940, and/or application(s) 945 of a computing system, as shown in FIG. 9.

Figure 7:
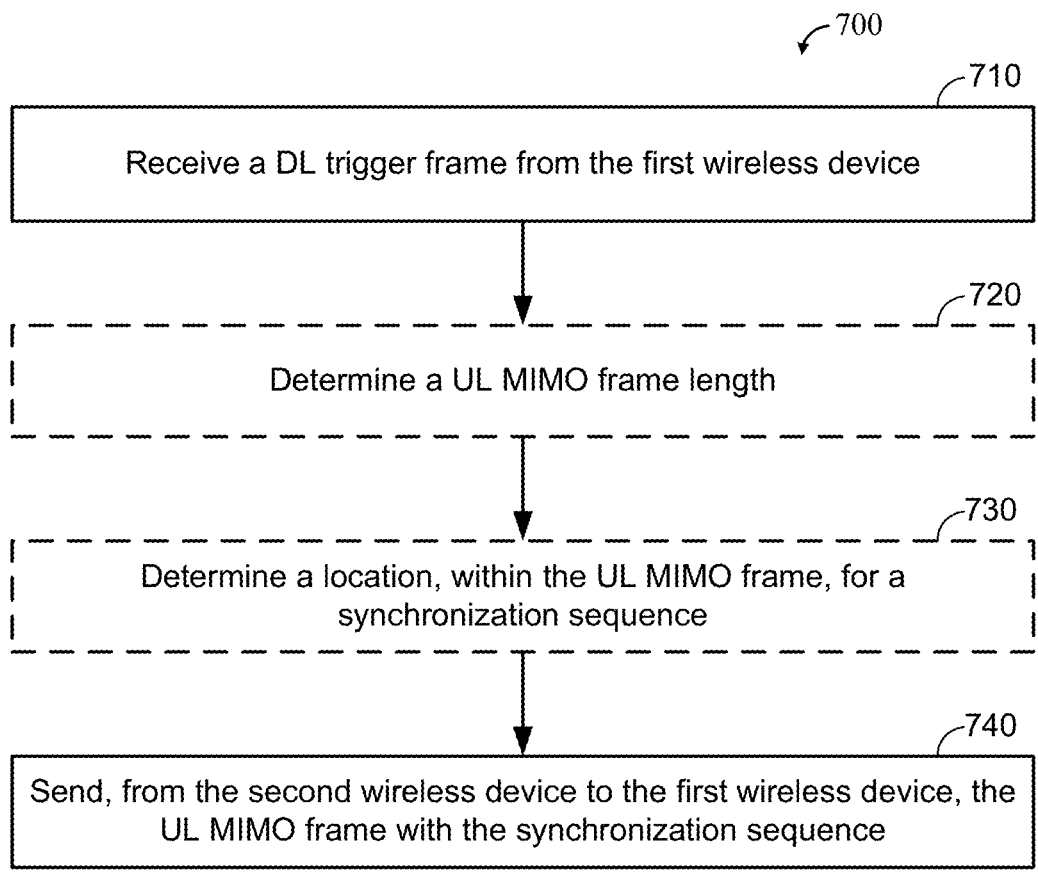
FIG. 7 is a flow diagram illustrating an embodiment of a method providing a UL MIMO frame for RTT calculation.

FIG. 7 is a flow chart of a method 700 of providing a UL MIMO frame for RTT calculation, according to one embodiment, corresponding to the functionality executed by the second wireless device referred to in FIG. 6. Again, a person of ordinary skill in the art will recognize that alternative embodiments may include methods in which the components shown in FIG. 7 are rearranged, omitted, merged, separated, and/or otherwise altered. Means for performing one or more of the components shown in FIG. 6 can include one or more components of a wireless device, such as the wireless device 800 shown in FIG. 8, and/or a computing device, such as the computing system 900 shown in FIG. 9. In some embodiments, a STA of a wireless system performs some or all of the blocks illustrated in FIG. 7.

Figure 8:
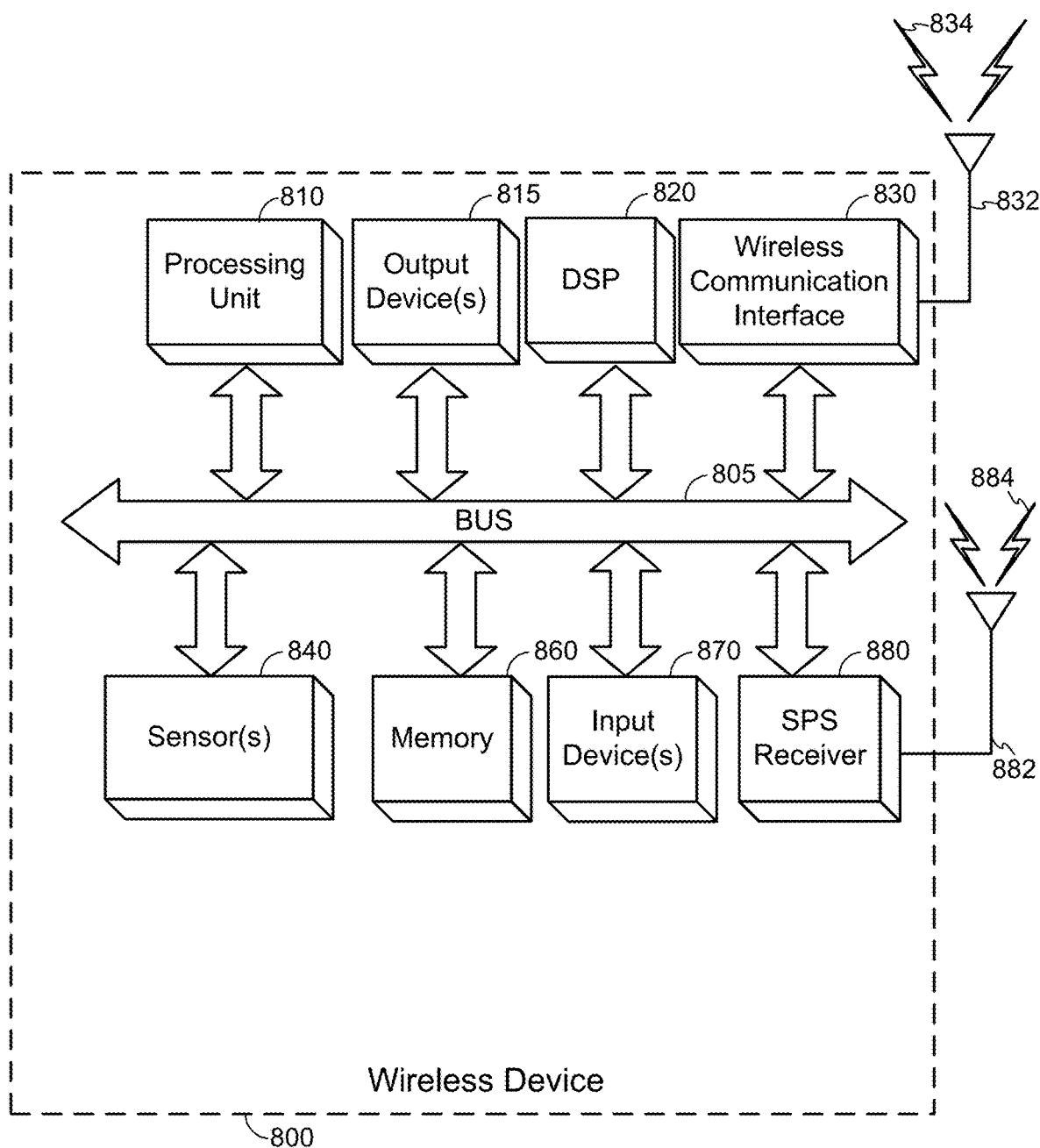
FIG. 8 is a block diagram an embodiment of a wireless device.

At block 710, a DL trigger frame from the first wireless device is received. As indicated above, the first wireless device may be an AP, and the DL trigger frame may conform to certain governing standards. The DL trigger frame may include information and/or requirements (e.g., frame length) for a UL MIMO frame generated in response. The functionality at block 710 may be performed, for example, by the processing unit 810, DSP 820, bus 805, wireless communication interface 830, wireless communication antenna(s) 832, and/or memory 860 of a wireless device 800 as shown in FIG. 8.

Optionally (indicated by dashed lines), at block 720, the method 700 includes determining a UL MIMO frame length. As previously indicated, the UL MIMO frame length may be a certain length (as illustrated in FIG. 4A), which may be indicated in the DL trigger frame and/or dictated by a governing standard. In such cases, the length of a synchronization sequence may also be determined to "pad" the frame so that the frame meets the certain length. In other embodiments, the UL MIMO frame length may be variable (as illustrated in FIGS. 4B and 4C). The functionality at block 720 may be performed, for example, by the processing unit 810, DSP 820, bus 805, and/or memory 860 of a wireless device 800 as shown in FIG. 8.

At block 730, the method 700 optionally includes determining a location, within the UL MIMO frame, for a synchronization sequence. Similar to the UL MIMO frame length, the location of the synchronization sequence may be dictated by a governing standard and/or indicated in the DL trigger frame. Moreover, as indicated elsewhere, a UL MIMO frame may include a plurality of synchronization sequences throughout the frame. The functionality at block 730 may be performed, for example, by the processing unit 810, DSP 820, bus 805, and/or memory 860 of a wireless device 800 as shown in FIG. 8.

Block 740 includes sending, from the second wireless device to the first wireless device, the UL MIMO frame with the synchronization sequence. As indicated previously, a SIFS value may be indicative of a time between when the functionality at block 710 is performed and when the functionality at block 740 is performed. In some embodiments, the UL MIMO frame can include information indicative of the SIFS value. In some embodiments, the second wireless device may communicate the SIFS value to the first wireless device separately. The functionality at block 740 may be performed, for example, by the processing unit 810, DSP 820, bus 805, wireless communication interface 830, wireless communication antenna(s) 832, and/or memory 860 of a wireless device 800 as shown in FIG. 8.

FIG. 8 illustrates an embodiment of a wireless device 800, which can be utilized as described herein above. For example, the wireless device 800 can be used as an AP and/or STA as described in relation to the embodiments previously provided herein (e.g., with regard to FIGS. 1 and 6). It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. In some embodiments, for example, the wireless device 800 can be a cellular telephone or other mobile electronic device. In some embodiments, the wireless device may be a stationary device, such as an AP. As such, as previously indicated, components may vary from embodiment to embodiment.

The wireless device 800 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 8, some embodiments may have a separate DSP 820, depending on desired functionality. The wireless device 800 also can include one or more input devices 870, which can include without limitation a touch screen, a touch pad, microphone, button(s), dial(s), switch(es), and/or the like;

and one or more output devices 815, which can include without limitation a display, light emitting diode (LED), speakers, and/or the like.

The wireless device 800 might also include a wireless communication interface 830, which can include without limitation a modem, a network card, an infrared communication device, a wireless communication device, and/or a chipset (such as a Bluetooth™ device, an IEEE 802.11 device (e.g., a device utilizing one or more of the 802.11 standards described herein), an IEEE 802.15.4 device, a WiFi device, a WiMax device, cellular communication facilities, etc.), and/or the like. The wireless communication interface 830 may permit data to be exchanged with a network, wireless access points, other computer systems, and/or any other electronic devices described herein, such as the configuration of FIG. 1. The communication can be carried out via one or more wireless communication antenna(s) 832 that send and/or receive wireless signals 834.

Depending on desired functionality, the wireless communication interface 830 can include separate transceivers to communicate with base transceiver stations and other wireless devices and access points, which may include communicating with different data networks and/or network types. A wireless wide-area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The wireless device 800 can further include sensor(s) 840. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 840 can be utilized, among other things, for dead reckoning and/or other positioning methods. Such positioning methods may be used to determine a location of the wireless device 800, and may utilize and/or complement the RTT values obtained using the techniques described herein.

Embodiments of the mobile device may also include a Standard Positioning Service (SPS) receiver 880 capable of receiving signals 884 from one or more SPS satellites using an SPS antenna 882. Such positioning can be utilized to complement and/or incorporate the techniques for calculating RTT described herein. The SPS receiver 880 can extract a position of the mobile device, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 880 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The wireless device 800 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the wireless device 800 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIGS. 6 and/or 7 might be implemented as code and/or instructions executable by the wireless device 800, a processing unit within a wireless device 800, and/or another device of a wireless system. In an aspect, then, such code and/or instructions can be used to configure and/or adapt a general purpose computer (or other device) to perform one or more operations in accordance with the described methods.

FIG. 9 illustrates components of a computing system 900, according to one embodiment. For example, the computing system can be used as an AP as described in relation to the embodiments previously provided herein, and may communicate in a wireless communication system with one or more STAs, as previously discussed. In contrast to the wireless device 800 of FIG. 8 which may be mobile, the computing system 900 of FIG. 9 may, for example, be a stationary device (or set of devices). It should be noted that FIG. 9 is meant only to provide a generalized illustration of various components, any or all of which may be utilized as appropriate. Moreover, system elements may be implemented in a relatively separated or relatively more integrated manner.

The computing system 900 is shown comprising hardware elements that can be electrically coupled via a bus 905 (or may otherwise be in communication, as appropriate). The hardware elements may include a processing unit 910, including without limitation one or more general-purpose processors and/or one or more special-purpose processors (such as digital signal processing chips, graphics acceleration processors, and/or the like); and one or more input devices 915. The input device(s) 915 can include without limitation camera(s), a touchscreen, a touch pad, microphone, a keyboard, a mouse, button(s), dial(s), switch(es), and/or the like; and one or more output devices 920, which can include without limitation a display device, a printer, display, light emitting diode (LED), speakers, and/or the like.

The computing system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For instance, storage device(s) 925 may include a database 927 (or other data structure) configured to store SIFS values as described in embodiments herein, which may be provided to APs and/or other devices via the communications subsystem 930.

The computing system 900 can also include a communications subsystem 930 which can include wireless communication technologies managed and controlled by a wireless communication interface 933, as well as wired technologies. As such, the communications subsystem can include, without limitation, a modem, a network interface (wireless, wired, both, or other combination thereof), an infrared communication device, a wireless communication device, and/or a chipset (such as a Bluetooth™ device, an 802.11 device (e.g., a device utilizing one or more of the 802.11 standards described herein), a WiFi device, a WiMax device, cellular communication facilities, etc.), and/or the like. The subcomponents of the interface may vary, depending on the type of computing system 900 (e.g., mobile phone, personal computer, etc.) The communications subsystem 930 may include one or more input and/or output communication interfaces, such as the wireless communication interface 933, to permit data to be exchanged with a data network, other computer systems, and/or any other devices described herein. Moreover, the communications subsystem 930 may permit the computing system 900 to determine RTT via UL MIMO process as detailed herein.

In many embodiments, the computing system 900 will further comprise a working memory 935, which can include a RAM or ROM device, as described above. Software elements, shown as being currently located within the working memory 935, can include an operating system 940, device drivers, executable libraries, and/or other code, such as one or more application programs 945, which may comprise software programs provided by various embodiments, and/or may be designed to implement methods, and/or configure systems, provided by other embodiments, as described herein, such as some or all of the methods described in relation to FIGS. 2-7. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods. The storage of the RTT value at block 660 of the method of FIG. 6, for example, can be performed the storage device(s) 925 and/or working memory 935.

A set of these instructions and/or code might be stored on a non-transitory computer-readable storage medium, such as the non-transitory storage device(s) 925 described above. In some cases, the storage medium might be incorporated within a computer system, such as the computing system 900. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by the computing system 900 and/or might take the form of source and/or installable code, which, upon compilation and/or installation on the computing system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments described herein. Also, a number of steps may be undertaken before, during, or after the above elements are considered. Accordingly, the above description does not limit the scope of the disclosure.

What is claimed is:

1. A method of calculating round trip time (RTT) between a first wireless device and a second wireless device, the method comprising:
   sending an 802.11 downlink (DL) trigger frame with the first wireless device, wherein the DL trigger frame comprises an indicated location for a synchronization sequence within uplink (UL) Multiple-Input Multiple-Output (MIMO) frames responsive to the DL trigger frame;
   determining a first time, wherein the first time corresponds to a time at which the DL trigger frame was sent;
   receiving, in response to the DL trigger frame at the first wireless device, a plurality of UL MIMO frames from a plurality of wireless devices, including a UL MIMO frame from the second wireless device, wherein the UL MIMO frame from the second wireless device has the synchronization sequence at the indicated location;
   determining a second time corresponding to a time at which the UL MIMO frame from the second wireless device was received; and
   determining the RTT between the first wireless device and the second wireless device based on the determined first time and the determined second time.

2. The method of claim 1, further comprising determining the second time is further based on the synchronization sequence within the UL MIMO frame from the second wireless device.

3. The method of claim 2, wherein the synchronization sequence directly follows a preamble of the UL MIMO frame from the second wireless device.

4. The method of claim 2, wherein the synchronization sequence comprises:
   a Zadofff-chu sequence,
   a Long Training Field (LTF)-like sequence,
   an M sequence,
   a Gold sequence,
   a Costas sequence,
   a Bjork sequence set,
   a Kasami sequence, or
   a Zero-Correlation Zone sequence,
   or a combination thereof.

5. The method of claim 1, further comprising:
   storing a value of the RTT;
   receiving, at the first wireless device, an RTT request; and
   in response to receiving the RTT request, sending the stored value of the RTT.

6. The method of claim 1, wherein determining the RTT further comprises determining a short inter-frame spacing (SIFS) value.

7. The method of claim 6, wherein the SIFS value is determined from information provided from the second wireless device to the first wireless device.

8. The method of claim 7, wherein the provided information is included in the UL MIMO frame from the second wireless device.

9. The method of claim 6, wherein the SIFS value is obtained from a database.

10. A method of calculating round trip time (RTT) between a first wireless device to a second wireless device, the method comprising:
    receiving, with the second wireless device, an 802.11 downlink (DL) trigger frame sent by the first wireless device, wherein the DL trigger frame comprises an indicated location for a synchronization sequence within uplink (UL) Multiple-Input Multiple-Output (MIMO) frames responsive to the DL trigger frame;
    determining, at the second wireless device, a UL MIMO frame length;
    determining a synchronization sequence length based at least in part on the determined UL MIMO frame length; and
    sending, from the second wireless device to the first wireless device, the UL MIMO frame with the synchronization sequence at the indicated location within the UL MIMO frame and having the determined synchronization sequence length.

11. The method of claim 10, wherein the indicated location for the synchronization sequence is immediately after a preamble of the UL MIMO frame.

12. The method of claim 10, wherein the indicated location for the synchronization sequence is at an end of the UL MIMO frame.

13. The method of claim 10, wherein determining the synchronization sequence length comprises determining a length of the synchronization sequence such the UL MIMO frame, including the synchronization sequence, reaches a certain length.

14. A first wireless device comprising:
a wireless communication interface configured to send an 802.11 downlink (DL) trigger frame, wherein the DL trigger frame comprises an indicated location for a synchronization sequence within uplink (UL) Multiple-Input Multiple-Output (MIMO) frames responsive to the DL trigger frame;
a memory; and
a processing unit communicatively coupled to the wireless communication interface and the memory, the processing unit configured to cause the first wireless device to:
determine a first time corresponding to a time at which the DL trigger frame was sent;
receive, in response to the DL trigger frame via the wireless communication interface, a plurality of UL MIMO frames from a plurality of wireless devices, including a UL MIMO frame from a second wireless device, wherein the UL MIMO frame from the second wireless device has the synchronization sequence at the indicated location;
determine a second time corresponding to a time at which the UL MIMO frame from the second wireless device was received; and
determine a round trip time (RTT) between the first wireless device and the second wireless device based on the determined first time and the determined second time.

15. The first wireless device of claim 14, wherein the processing unit is further configured to cause the first wireless device to determine the second time further based on the synchronization sequence within the UL MIMO frame from the second wireless device.

16. The first wireless device of claim 14, wherein the processing unit is further configured to cause the first wireless device to:
store a value of the RTT in the memory,
receive, via the wireless communication interface, an RTT request, and
in response to receiving the RTT request, send the stored value of the RTT via the wireless communication interface.

17. The first wireless device of claim 14, wherein the processing unit is further configured to cause the first wireless device to determine the RTT by determining a short inter-frame spacing (SIFS) value.

18. The first wireless device of claim 17, wherein the processing unit is configured to cause the first wireless device to determine the SIFS value from information provided from the second wireless device to the first wireless device.

19. The first wireless device of claim 18, wherein the processing unit is configured to cause the first wireless device to extract the provided information from the UL MIMO frame from the second wireless device.

20. The first wireless device of claim 17, wherein the processing unit is configured to cause the first wireless device to obtain the SIFS value from a database.

21. A second wireless device comprising:
a wireless communication interface configured to receive an 802.11 downlink (DL) trigger frame from a first wireless device, wherein the DL trigger frame comprises an indicated location for a synchronization sequence within uplink (UL) Multiple-Input Multiple-Output (MIMO) frames responsive to the DL trigger frame;
a memory; and
a processing unit communicatively coupled to the wireless communication interface and the memory, the processing unit configured to cause the second wireless device to:
determine a UL MIMO frame length;
determine a synchronization sequence length based at least in part on the determined UL MIMO frame length; and
send, to the first wireless device via the wireless communication interface, the UL MIMO frame with the synchronization sequence at the indicated location within the UL MIMO frame and having the determined synchronization sequence length.

22. The second wireless device of claim 21, wherein the processing unit is configured to cause the second wireless device to determine the synchronization sequence length comprises at least in part by determining a length of the synchronization sequence such that the UL MIMO frame, including the synchronization sequence, reaches a certain length.

23. A first wireless device comprising:
means for sending an 802.11 downlink (DL) trigger frame, wherein the DL trigger frame comprises an indicated location for a synchronization sequence within uplink (UL) Multiple-Input Multiple-Output (MIMO) frames responsive to the DL trigger frame;
means for determining a first time corresponding to a time at which the DL trigger frame was sent;
means for receiving, in response to the DL trigger frame, a plurality of UL MIMO frames from a plurality of wireless devices, including a UL MIMO frame from a second wireless device, wherein the UL MIMO frame from the second wireless device has the synchronization sequence at the indicated location;
means for determining a second time corresponding to a time at which the UL MIMO from the second wireless device frame was received; and
means for determining a round trip time (RTT) between the first wireless device and the second wireless device based on the determined first time and the determined second time.

24. The first wireless device of claim 23, further comprising means for basing the determined second time on the synchronization sequence within the UL MIMO frame from the second wireless device.

25. The first wireless device of claim 23, further comprising:
means for storing a value of the RTT,
means for receiving, at the first wireless device, an RTT request, and
means for, in response to receiving the RTT request, sending the stored value of the RTT.

26. The first wireless device of claim 23, further comprising means for determining a short inter-frame spacing (SIFS) value.

27. The first wireless device of claim 26, further comprising means for determining the SIFS value from information provided from the second wireless device to the first wireless device.

28. The first wireless device of claim 27, further comprising means for extracting the provided information from the UL MIMO frame from the second wireless device.

29. The first wireless device of claim 26, further comprising means for obtaining the SIFS value from a database.

30. A second wireless device, the comprising:
means for receiving an 802.11 downlink (DL) trigger frame sent by a first wireless device, wherein the DL trigger frame comprises an indicated location for a synchronization sequence within uplink (UL) Multiple-Input Multiple-Output (MIMO) frames responsive to the DL trigger frame;
means for determining an UL MIMO frame length;
means for determining a synchronization sequence length based at least in part on the determined UL MIMO frame length; and
means for sending, to the first wireless device, the UL MIMO frame with the synchronization sequence at the indicated location within the UL MIMO frame and having the synchronization sequence length.

31. The second wireless device of claim 30, further comprising means for locating the synchronization sequence immediately after a preamble of the UL MIMO frame.

32. The second wireless device of claim 30, further comprising means for locating the synchronization sequence at an end of the UL MIMO frame.

33. The second wireless device of claim 30, wherein the means for determining the synchronization sequence length comprises means for determining a length of the synchronization sequence such that the UL MIMO frame, including the synchronization sequence, reaches a certain length.

34. A non-transitory computer-readable medium having instructions embedded thereon for calculating round trip time (RTT) between a first wireless device to a second wireless device, the instructions including computer code for:
sending an 802.11 downlink (DL) trigger frame with the first wireless, wherein the DL trigger frame comprises an indicated location for a synchronization sequence within uplink (UL) Multiple-Input Multiple-Output (MIMO) frames responsive to the DL trigger frame;
determining a first time corresponding to a time at which the DL trigger frame was sent;
receiving, in response to the DL trigger frame at the first wireless device, a plurality of UL MIMO frames from a plurality of wireless devices, including a UL MIMO frame from the second wireless device, wherein the UL MIMO frame from the second wireless device has the synchronization sequence at the indicated location;
determining a second time corresponding to a time at which the UL MIMO frame from the second wireless device was received; and
calculating the RTT between the first wireless device and the second wireless device based on the determined first time and the determined second time.

35. The computer-readable medium of claim 34, wherein the computer code for determining the second time includes computer code for basing the determination of the second time on the synchronization sequence within the UL MIMO frame from the second wireless device.

36. The computer-readable medium of claim 34, further comprising computer code for:
storing a value of the RTT,
receiving, at the first wireless device, an RTT request, and in response to receiving the RTT request, sending the stored value of the RTT.

37. A non-transitory computer-readable medium having instructions embedded thereon for calculating round trip time (RTT) between a first wireless device to a second wireless device, the instructions including computer code for:
receiving, with the second wireless device, an 802.11 downlink (DL) trigger frame sent by the first wireless device, wherein the DL trigger frame comprises an indicated location for a synchronization sequence within uplink (UL) Multiple-Input Multiple-Output (MIMO) frames responsive to the DL trigger frame;
determining, at the second wireless device, an UL MIMO frame length;
determining a synchronization sequence length based at least in part on the determined UL MIMO frame length; and
sending, from the second wireless device to the first wireless device, the UL MIMO frame with the synchronization sequence at the indicated location within the UL MIMO frame and having the determined synchronization sequence length.

38. The computer-readable medium of claim 37, further comprising computer code for determining a length of the synchronization sequence such that the UL MIMO frame, including the synchronization sequence, reaches a certain length.

* * * * *